(12) United States Patent
Nonaka et al.

(10) Patent No.: US 8,347,091 B2
(45) Date of Patent: Jan. 1, 2013

(54) AUTHENTICATOR APPARATUS

(75) Inventors: Masao Nonaka, Osaka (JP); Natsume Matsuzaki, Osaka (JP); Yoshikatsu Ito, Osaka (JP); Kaoru Yokota, Hyogo (JP); Yuichi Futa, Osaka (JP); Manabu Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 972 days.

(21) Appl. No.: 12/438,901

(22) PCT Filed: Nov. 2, 2007

(86) PCT No.: PCT/JP2007/071414
§ 371 (c)(1),
(2), (4) Date: Feb. 25, 2009

(87) PCT Pub. No.: WO2008/056613
PCT Pub. Date: May 15, 2008

(65) Prior Publication Data
US 2009/0271860 A1    Oct. 29, 2009

(30) Foreign Application Priority Data

Nov. 6, 2006   (JP) ................. 2006-299904
Nov. 6, 2006   (JP) ................. 2006-299905
Nov. 6, 2006   (JP) ................. 2006-299906

(51) Int. Cl.
G06F 21/00        (2006.01)
(52) U.S. Cl. ......... 713/168; 713/169; 713/170; 713/171
(58) Field of Classification Search ........... 713/168–171
See application file for complete search history.

(56) References Cited

U.S. PATENT DOCUMENTS 6,161,213 A    12/2000    Lofstrom
(Continued)

FOREIGN PATENT DOCUMENTS

EP    1 501 236 A1    1/2005
(Continued)

OTHER PUBLICATIONS

International Search Report issued Jan. 22, 2009 in the International (PCT) Application of which the present application is the U.S. National Stage.

(Continued)

*Primary Examiner* — Benjamin Lanier
(74) *Attorney, Agent, or Firm* — Wenderoth, Lind & Ponack, L.L.P.

(57) ABSTRACT

An authenticator apparatus which makes it difficult for an unauthorized user to masquerade and enhances safety includes an authenticating information holding unit (102) previously stores characteristic information indicating an input and output characteristic involving an environment change of an authentic authenticatee apparatus entitled to be authentic, an authenticating information transmitting unit (107) which transmits authenticating information to a portable medium (2), a response information receiving unit (108) which receives response information outputted from the portable medium (2) in response to an input of the authenticating information, an environment selecting unit (105) which identifies an environment of the portable medium (2), and a response information confirming unit (109) which determines whether or not the authenticating information and the response information satisfy the input and output characteristic indicated in the characteristic information stored in the authenticating information holding unit (102), and judges that the portable medium (2) is authentic in the case where the input and output characteristic is satisfied, the authenticating information and the response information being in the environment identified by said environment identifying unit.

13 Claims, 9 Drawing Sheets

U.S. PATENT DOCUMENTS

| | | |
|---|---|---|
| 7,268,685 B2 | 9/2007 | Kwon et al. |
| 7,690,024 B2 | 3/2010 | Kinoshita et al. |
| 2002/0188857 A1 | 12/2002 | Orlando et al. |
| 2003/0204743 A1 | 10/2003 | Devadas et al. |
| 2004/0053429 A1 | 3/2004 | Muranaka |
| 2005/0270153 A1 | 12/2005 | Kwon et al. |
| 2006/0050580 A1 | 3/2006 | Yamaguchi et al. |
| 2006/0212709 A1 | 9/2006 | Kinoshita et al. |
| 2007/0044139 A1 | 2/2007 | Tuyls et al. |
| 2007/0113294 A1* | 5/2007 | Field et al. .............. 726/27 |

FOREIGN PATENT DOCUMENTS

| | | |
|---|---|---|
| EP | 1 501 236 B1 | 6/2008 |
| JP | 2000-083019 | 3/2000 |
| JP | 2002-537646 | 11/2002 |
| JP | 2003-51820 | 2/2003 |
| JP | 2005-045760 | 2/2005 |
| JP | 2005-523481 | 8/2005 |
| JP | 2005-353066 | 12/2005 |
| JP | 2006-60109 | 3/2006 |
| JP | 2006-221361 | 8/2006 |
| WO | 00/49538 | 8/2000 |
| WO | 02/45139 | 6/2002 |
| WO | 03/090259 | 10/2003 |
| WO | 2004/104899 | 12/2004 |

OTHER PUBLICATIONS

Tuyls et al., "Information-Theoretic Security Analysis of Physical Uncloneable Functions", *Financial Cryptography and Data Security*, pp. 141-155, 2005.

J.W. Lee et al., "A Technique to build a secret key in integrated circuits for identification and authentication applications," VLSI Circuits 2004, Digest of Technical Papers, 2004 Symposium on, Jun. 2004 (Abstract Only).

Damith C. Ranasinghe et al., "An integrable low-cost hardware random number generator," Proceedings of SPIE—The International Society for Optical Engineering, Mar. 2005 (Abstract Only).

* cited by examiner

FIG. 5

| Selected environment change information SF Selected environment information SE | Comparison result between selected first response information SR and the second response information Rr | Result information RS |
|---|---|---|
| SF=1 (Output change not observed) or SE=0 (First environment) | SR=Rr | RS=1 (Success) |
| | SR≠Rr | RS=0 (Failure) |
| SF=0 (Output change observed) and SE=1 (Second environment) | SR=Rr | RS=0 (Failure) |
| | SR≠Rr | RS=1 (Success) |

AUTHENTICATOR APPARATUS

TECHNICAL FIELD

The present invention relates to an authenticator apparatus authenticating an authenticatee apparatus including, for example, an Integrated Circuit (IC) card.

BACKGROUND ART

Authenticating techniques have been utilized to confirm the identity of a user. One of the authenticating techniques is the challenge and response authentication employing the secret key encryption scheme. In the challenge and response authentication, the same key has been previously shared with an authentic authenticatee apparatus owned by the user and an authenticator apparatus authenticating the authentic authenticatee apparatus (hereinafter, referred to as a shared key). Then, when authenticating the authenticatee apparatus, the authenticator apparatus sends the authenticatee apparatus random numbers as challenge information. The authenticatee apparatus encrypts, using the shared key, the received challenge information as a message. Then, the authenticatee apparatus returns the encrypted message to the authenticator apparatus as response information. The authenticator apparatus decrypts the received response information, using the same shared key. Thus, the authenticator apparatus confirms whether or not the decrypted message matches with the initially sent challenge information. In the case where the decrypted message matches with the initially sent challenge information, the authenticator apparatus judges that the authenticatee apparatus obtains the previously shared key, and that the user who owns the authenticatee apparatus is authentic. This enables the authenticator apparatus to confirm the identity of the user.

However, in the case where the previously shared key is revealed to a third person in the above described challenge and response authentication, the third person can masquerade as the authentic user of the authenticatee apparatus. One of the causes of the revealed shared key is insufficient tamper-resistant implementation on an authenticatee apparatus, holding a secret shared key, such as a user terminal and an IC card. Here, an unauthorized access to the authenticatee apparatus causes a secret shared key to be revealed. As a solution to the problem, Patent Reference 1 has disclosed a technique to execute the challenge and response authentication, using the Physical Unclonable Function (referred to as the PUF, hereinafter) (Paragraphs 0061 to 0076 in Patent Reference 1).

Fine chip-to-chip variations in physical characteristics are observed even though the chips are produced out of the same mask. The PUF technique, taking advantage of the fine variations for generating chip unique information, is utilized for a chip unique identifier and a chip unique key. A circuit produced based on the PUF technique (referred to as a PUF circuit, hereinafter), as a function, receives input data and outputs output data corresponding to the input data. In the challenge and response authentication utilizing the PUF circuit, first, the authenticator apparatus has, in advance, initially registered output data of an authentic authenticatee apparatus, using the authentic authenticate apparatus including the PUF circuit. In other words, the authenticator apparatus obtains and stores the input data of the PUF circuit and the corresponding output data thereto. Then, the authenticatee apparatus is given to the user, the authenticatee. When authenticating, the authenticator apparatus sends the authenticatee apparatus a piece of pre-obtained input data of the PUF circuit as the challenge information. The authenticatee apparatus inputs the received challenge information into the PUF circuit as the input data, and obtains the output data of the PUF circuit. Then, the authenticatee apparatus returns the output data to the authenticator apparatus as the response information. The authenticator apparatus confirms whether or not the received response information and the output data corresponding to the initially sent input data corresponds. In the case where the received information matches with the output data, the authenticator apparatus judges that the authenticatee apparatus is an authentic apparatus, and thus the user who owns the authenticatee apparatus is authentic.

A feature of the PUF circuit is to make production of another clone circuit having the same physical characteristics (PUF chip) difficult since the PUF circuit takes advantage of the fine chip-to-chip variations in physical characteristics. A use of the PUF circuit for authentication solves a problem for the above described challenge and response authentication; that is, a problem that the leaked secret key allows the third person to masquerade. To implement the PUF circuit in the Patent Reference 1, the chip unique information is generated, focusing on chip-to-chip differences in wiring of a semiconductor circuit and propagation delay of a part of the semiconductor circuit. Specifically, the PUF circuit includes plural paths passing through different wirings and parts. Then, the PUF circuit uniquely selects two of the above plural paths in the semiconductor circuit based on the input data, compares propagation delays between the two paths, and generates a chip unique value (a value of 1 bit, for example) depending on which path causes a longer delay.

It is known, however, that a propagation delay of each of the paths in the PUF circuit varies depending on variations of a temperature of the PUF circuit (a surface temperature and an external temperature) and an amount of a supply voltage to the PUF circuit. Accordingly, even though the same input data is inputted in the same PUF circuit, the output data possibly changes in the case where the temperature of the PUF circuit and the amount of the supply voltage to the PUF circuit vary. The theory works as follows.

First, two paths (path 1 and path 2) are assumed to be selected when the PUF circuit receives the same input data. Here, under a first environment (temperature and supply voltage), the path 1 causes a longer propagation delay than the path 2 does. As a result, the PUF circuit outputs, for example, a unique bit indicating 1. Meanwhile, under a second environment which is different from the above first environment, a magnitude correlation between the path 1 and the path 2 may reverse when the same PUF circuit receives the same input data, and the path 2 may cause a longer propagation delay than the propagation delay of the path 1. In this case, the PUF circuit outputs a different unique bit, from the initial unique bit, indicating 0.

As described above, the PUF circuit possibly outputs different output data depending on an environmental change even though the same input data is inputted in the same PUF circuit. Such a case may cause the authenticator apparatus to falsely recognize the authentic user as an unauthorized user.

Hence, the Patent Reference 1 has overcome the problem, focusing on the fact that the magnitude correlation between the paths 1 and 2 does not reverse despite a more or less environmental change (temperature and amount of supply voltage) in the case where the propagation delays between the paths 1 and 2 are considerably different. Specifically, the authenticator apparatus previously comprehends input data allowing paths 1 and 2 having propagation delays significantly different each other to be selected. Only such input data does the authenticator apparatus use in the challenge and response authentication (paragraph numbers 0107 to 0112 in Patent Reference 1).
[Patent Reference 1] US 2003/0204743

SUMMARY OF THE INVENTION

Problems that Invention is to Solve

The authenticator apparatus described in the above Patent Reference 1 still has a problem in that a sophisticated unauthorized user can masquerade as an authentic user. In other words, the authenticator apparatus develops problems to judge an unauthorized authenticatee apparatus as an authentic authenticator apparatus, and to falsely recognize a user having the unauthorized authenticatee apparatus as the authentic user.

The masquerade described above is attempted as follows. First, an authentic authenticatee apparatus including the PUF circuit falls into a sophisticated unauthorized user. Then, input and output data of a PUF circuit included in the authentic authenticatee apparatus is obtained to put into a table. Then, another fake apparatus, in which the input and output data formed in the table is embedded (a counterfeit card, for example), is created. When authenticated by the authenticator apparatus, the faked apparatus uses received challenge information as the input data, obtains output data corresponding to the input data from the table, and outputs the output data as response information. The unauthorized user creates such a fake apparatus to masquerade as the authentic user.

The present invention is conceived in view of the above problem and has as an objective to provide an authenticator apparatus which makes it difficult for a sophisticated unauthorized user to masquerade.

Means to Solve the Problems

In order to implement the above objectives, an authenticator apparatus in the present invention authenticates an authenticatee apparatus and includes: a storing unit which previously stores characteristic information indicating an input and output characteristic involving an environment change of an authentic authenticatee apparatus entitled to be authentic; an authenticating information transmitting unit transmitting authenticating information to the authenticatee apparatus; a response information receiving unit receiving response information outputted from the authenticatee apparatus in response to an input of the authenticating information; an environment identifying unit identifying an environment of the authenticatee apparatus; and a judging unit determining whether or not the authenticating information and the response information satisfy the input and output characteristic indicated in the characteristic information stored in the storing unit, and judging that the authenticatee apparatus is authentic in the case where the input and output characteristic is satisfied, the authenticating information and the response information being in the environment identified by the environment identifying unit. For example, the authenticator apparatus further includes an environment setting unit setting the environment of the authenticatee apparatus, wherein the environment identifying unit identifies the environment set by the environment setting unit.

Thus, the authenticator apparatus in the present invention judges whether or not the authenticatee apparatus is authentic in accordance with whether or not the authenticating information inputted in the authenticatee apparatus, the response information outputted from the authenticatee apparatus in response to the authenticating information, and an environment in the authenticatee apparatus at the input and the output satisfy input and output characteristics involving an authentic environment change. In other words, the present invention judges whether or not the authenticatee apparatus is authentic not only by an input and an output of the authenticatee apparatus, as has conventionally judged. In addition, the present invention takes into consideration an environment in the authenticatee apparatus at an input and an output in order to judge whether or not the authenticatee apparatus is authentic. Consequently, even though a sophisticated unauthorized user generates a table by obtaining plural inputs to the authentic authenticatee apparatus and plural outputs corresponding to the plural inputs, and embeds the table into a counterfeit card, the table fails to indicate the input and output characteristics involving the environment change of the authentic authenticatee apparatus. Therefore, it will be highly improbable for authenticating information inputted into the counterfeit card, response information outputted from the counterfeit card in response to the authenticating information, and an environment of the counterfeit card at the input and the output to satisfy the input and output characteristics involving an authentic environment change. Hence, the counterfeit card is judged as an unauthorized apparatus. In other words, the present invention makes it difficult for the sophisticated unauthorized user to masquerade. The present invention is particularly effective when the authentic authenticatee apparatus has input and output characteristics providing different outputs in response to the same input depending on an environment variation in a temperature of the authentic authenticate apparatus and a voltage supplied to the authenticatee apparatus.

In addition, the characteristic information may indicate input data, output data, and change identification data as the input and output characteristic, the output data being outputted in response to an input of the input data by the authentic authenticatee apparatus in a predetermined first environment, the change identification data indicating whether or not an output in response to the input of the input data from the authentic authenticatee apparatus in a second environment changes from the output data, the second environment being different from the first environment, and the authenticating information transmitting unit may transmit the input data as the authenticating information. For example, the judging unit compares the response information and the output data either when the change identification data indicates no change in the output or when the environment identified by the environment identifying unit is the first environment, and judges that the authenticatee apparatus is authentic in the case where the response information and the output data are equivalent to each other; and compares the response information and the output data when the change identification data indicates a change in the output, and the environment identified by the environment identifying unit is the second environment, and judges that the authenticatee apparatus is authentic in the case where the response information and the output data are different from each other.

When change identification data indicates no variation, or the environment identified by the environment identifying unit is the first environment, the response information must be identical to the output data indicated by the characteristics information in the case where the authenticatee apparatus is authentic. Thus, the present invention can correctly judge that the authenticatee apparatus is authentic when the response information matches the output data in the above case. Further, when the change identification data indicates a variation in the output, and the environment identified by the environment identifying unit is the second environment, the response information must be different from the output data indicated by the characteristics information in the case where the authenticatee apparatus is authentic. Thus, the present invention can correctly judge that the authenticatee apparatus is authentic when the response information is different from the output data in the above case.

Moreover, the storing unit stores the characteristic information indicating a plurality of groups each including the input data, the output data, and the change identification data, the authenticator apparatus further includes a group selecting unit selecting any one group out of the plurality of groups indicated in the characteristic information, the authenticating information transmitting unit transmits input data, included in the group selected by the group selecting unit, as the authenticating information, and the judging unit compares the response information with output data included in a same group to which the input data belongs, the input data being transmitted by the authenticating information transmitting unit. For example, the group selecting unit sequentially selects groups out of the plurality of groups for the authenticatee apparatus, the authenticating information transmitting unit transmits input data included in each of the selected groups as the authenticating information with respect to each of selections of the group by the group selecting unit, the judging unit compares the response information with the output data corresponding to the input data with respect to each of transmissions of the input data, and judges whether or not the authenticatee apparatus is authentic, and the authenticator apparatus further includes a final determining unit: determining whether or not a proportion of the number of times, which the authenticatee apparatus has been determined to be authentic out of the number of determinations by the judging unit, is not less than a predetermined proportion; and finally judging that the authenticatee apparatus is authentic in the case where the proportion is not less than the predetermined proportion.

Thus, the authenticator apparatus in the present invention can correctly authenticate an authenticatee apparatus with enhanced authentication accuracy. This is because the authenticator apparatus: judges, by each of sets of response information corresponding to associated plural pieces of authenticating information, that whether or not the authenticatee apparatus is authentic; and determines the authenticatee apparatus to be consequently authentic when the proportion of the judgments indicating that the authenticatee apparatus is authenticate is not less than a predetermined proportion.

Further, the authenticatee apparatus in the present invention is subject to authentication by the authenticator apparatus, and includes an authenticating information receiving unit receiving authenticating information from the authenticator apparatus; a response information outputting unit obtaining the authenticating information and outputting response information which corresponds to the authenticating information and possibly changes according to an environment; a response information transmitting unit transmitting the response information to the authenticator apparatus, the response information being outputted from the response information outputting unit; and a notifying unit notifying the authenticator apparatus of the environment of the response information outputting unit. For example, the response information outputting unit includes a Physical Unclonable Function (PUF) circuit, and outputs output data from the PUF circuit as the response information, the output data being outputted in response to an input of the authenticating information.

Since this notifies the authenticator apparatus of the environment of the response information outputting unit, the authenticator apparatus can readily be informed of the environment with no complex process such as setting and calculating an environment of the response information outputting unit in the authenticatee apparatus, and correctly authenticate the authenticatee apparatus utilizing the environment.

It is noted that the present invention can be implemented in a processing method executed by the authenticator apparatus and the authenticatee apparatus described above apparatuses, a program to cause a computer to execute the processing, and a system which consists of a recording medium, an integrated circuit, an authenticator apparatus and an authenticatee apparatus which store the program, as well as in the above-described authenticator apparatus and the authenticatee apparatus.

Effects of the Invention

An authenticator apparatus in the present invention is effective to prevent a sophisticated unauthorized user from masquerading.

BRIEF DESCRIPTION OF DRAWINGS

FIG. 5 is a table for describing a determination technique by a response information confirming unit in the embodiment of the present invention.

NUMERICAL REFERENCES

Figure 1:
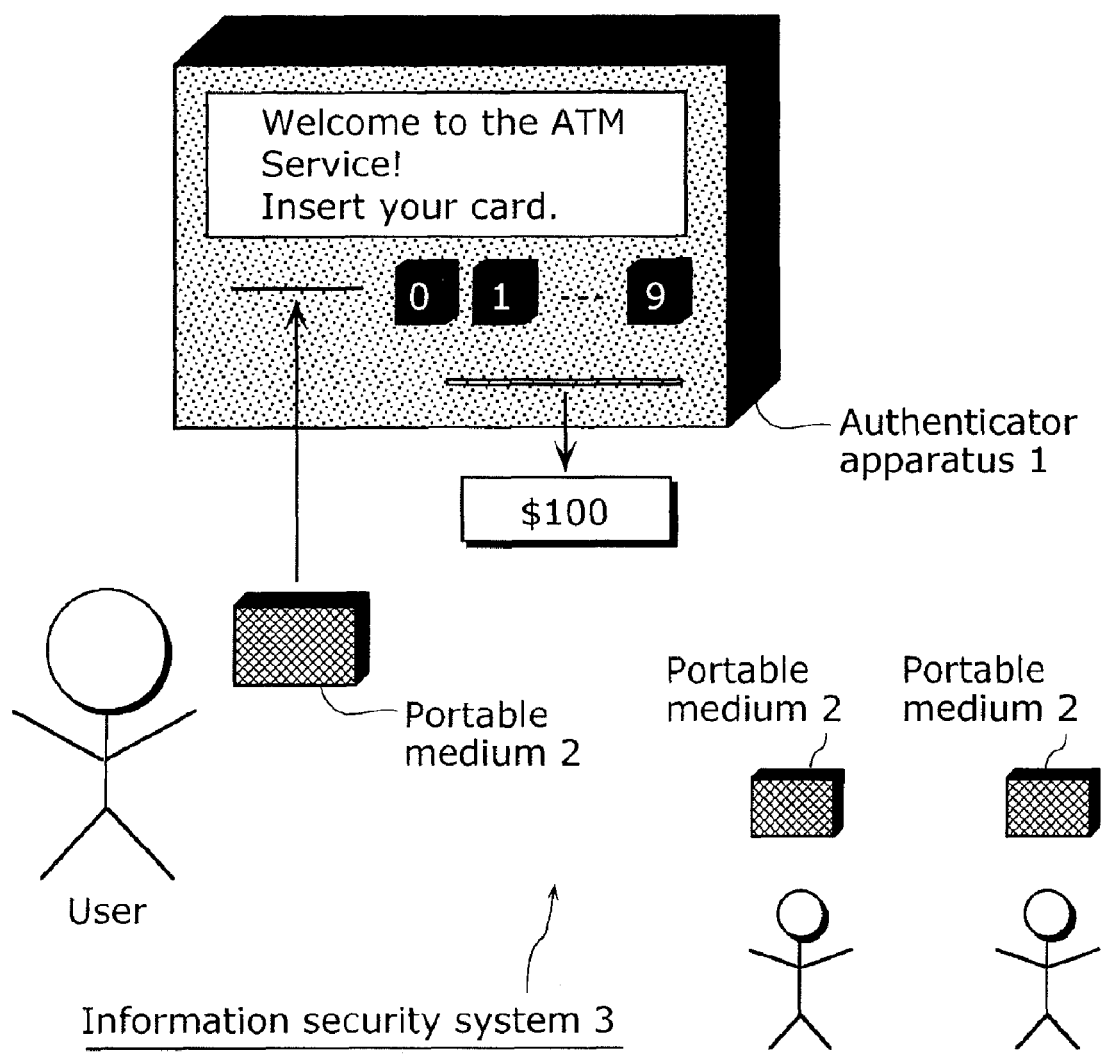
FIG. 1 is a block diagram showing an appearance of an information security system in an embodiment of the present invention.

1 Authenticator apparatus
101 Inputting unit
102 Authenticating information holding unit
103 Authenticating information selecting unit
104 Selected information holding unit
105 Environment selecting unit
106 Environment setting unit
107 Authenticating information transmitting unit
108 Response information receiving unit
109 Response information confirming unit
110 Result holding unit
111 Number-of-times controlling unit
112 Determining unit
113 Outputting unit
2 Portable medium
201 Portable medium information holding unit
202 Authenticating information receiving unit
203 Response information obtaining unit 204 Unique information generating unit
205 Response information transmitting unit

DETAILED DESCRIPTION OF THE INVENTION

Hereinafter, an embodiment of the present invention shall be described with reference to the drawings.

Embodiment

FIG. 1 is a diagram showing an appearance of an information security system in an embodiment of the present invention.

An information security system 3 in the embodiment of the present invention includes an authenticator apparatus 1 and portable media 2; namely, plural authenticatee apparatuses. The authenticator apparatus 1, offering a user some sort of services, includes an Automatic Teller Machine (ATM) providing services in bank deposits and postal savings in cash, and a content purchasing service for purchasing a paid content. FIG. 1 illustrates the authenticator apparatus 1 offering an ATM service. The authenticator apparatus 1 has a slot for one of the portable media 2 to be inserted. The portable medium 2 is a card given to a user holding a valid contract. The user inserts the portable medium 2 into the authenticator apparatus 1 to identify himself/herself (the fact that the user holds a valid contract), and receives various services. Each of users keeps a different card (portable medium 2). The portable medium 2 further includes a unique information generating unit generating output data to be changed depending on an environment (a temperature and a supply voltage amount) with respect to part of input data, and outputting the output data. The unique information generating unit is, for example, a PUF circuit.

The authenticator apparatus 1, authenticating each of the portable media 2, previously obtains: the input data and the output data for the unique information generating unit included in each of the portable media 2; and resistance characteristics of the unique information generating unit 204 against an environmental change (whether or not the output data changes when the environment is changed). Then, when authenticating, the authenticator apparatus 1 confirms the input data and the output data of the unique information generating unit by changing an environment of the inserted portable medium 2. In the case where the input data and the output data in the environment matches with: the previously registered input data and output data; and the resistance characteristics against the environmental change, the authenticator apparatus 1 judges that the inserted portable medium 2 is the authentic card, not a clone, and offers the user a service.

<A Structure of the Authenticator Apparatus 1>

Figure 2:
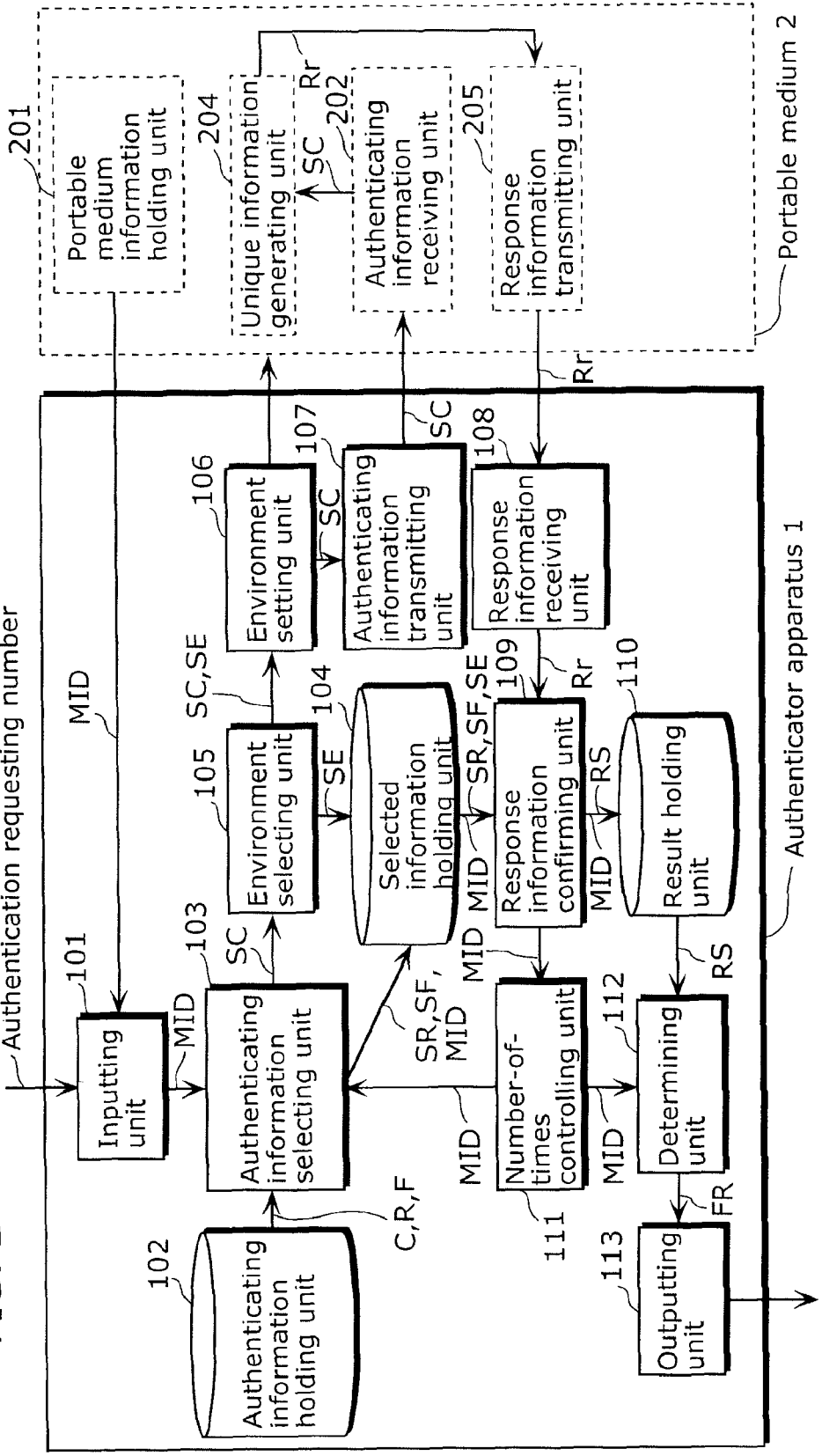
FIG. 2 includes a block diagram of the authenticator apparatus in the embodiment of the present invention.

FIG. 2 includes a block diagram showing a structure of the authenticator apparatus 1 in the embodiment of the present invention. Here, only some portions on authentication processing in the present invention shall be described. Meanwhile, some portions offering actual services (ATM services, for example) shall be omitted.

The authenticator apparatus 1 includes an inputting unit 101, an authenticating information holding unit 102, an authenticating information selecting unit 103, a selected information holding unit 104, an environment selecting unit 105, an environment setting unit 106, an authenticating information transmitting unit 107, a response information receiving unit 108, a response information confirming unit 109, a result holding unit 110, a number-of-times controlling unit 111, a determining unit 112, and an outputting unit 113. It is noted that the authenticator apparatus 1 includes a portable medium reader and writer unit transmitting and receiving data to and from the portable medium 2, which is omitted in FIG. 2. Further, FIG. 2 also includes a block diagram showing a partial structure of the portable medium 2. The block diagram mainly illustrates structural elements of the portable medium 2 transmitting and receiving information to and from the authenticator apparatus 1. A structure of the portable medium 2 shall be described in detail, using FIG. 8.

(1) The Inputting Unit 101

The inputting unit 101 receives an authentication requesting signal from the outside. For example, when detecting insertion of the portable medium 2 into the authenticator apparatus 1, the portable medium reader and writer unit transmits the authentication requesting signal to the inputting unit 101. Upon receiving the authentication requesting signal, the inputting unit 101 accesses a portable medium information holding unit 201 in the portable medium 2, and obtains a portable medium identifier MID specifying the portable medium 2. The portable medium identifier MID, an integer value of 128 bits, for example, is a unique serial number by each of the portable media 2. Then, the inputting unit 101 outputs the obtained portable medium identifier MID to the authenticating information selecting unit 103.

(2) The Authenticating Information Holding Unit 102

The authenticating information holding unit 102 holds associated data on each of the authentic portable media 2.

Figure 3:
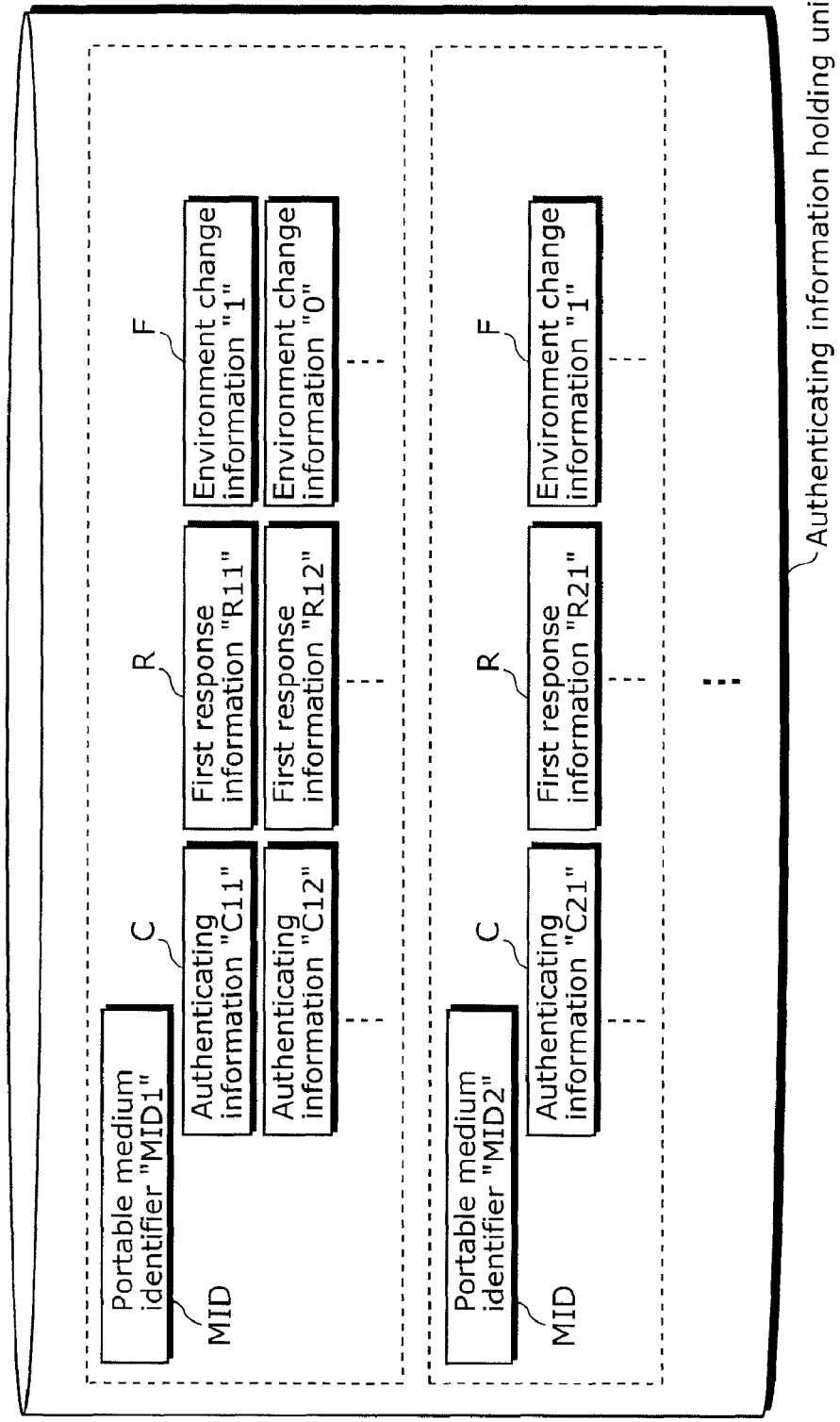
FIG. 3 is a block diagram showing data held in an authenticating information holding unit in the embodiment of the present invention.

FIG. 3 shows data held in the authenticating information holding unit 102.

As shown in FIG. 3, the authenticating information holding unit 102 holds, on the portable medium 2 basis, the portable medium identifier MID specifying a relevant portable medium 2, and plural groups each including authenticating information C, first response information R, and environment change information F each piece of information corresponding to the portable medium identifier MID. The portable medium identifier MID, specifying the portable medium 2, is identical to an identifier held in the portable medium information holding unit 201 of the corresponding portable medium 2. Each of the authenticating information C and the first response information R is respective input data (challenge data=authenticating information) and output data (response data=first response information) of a unique information generating unit 204 included in the portable medium 2 corresponding to the portable medium identifier MID. Here, the unique information generating unit 204 is in an after-described first environment. For example, each of the input data and the output data is an integer value of 128 bits. When the same data is inputted in the unique information generating unit 204 under the first environment (30° C. and the supply voltage of 1.8 volts, for example) and a second environment (40° C. and the supply voltage of 2.4 volts, for example) which is different from the first environment, the environment change information F indicates whether or not pieces of the output data to be outputted match each other. When the pieces of the output data match, for example, the environment change information indicates "1" (no change shown regardless in different temperatures), and when the pieces of the output data do not match, the environment change information indicates "0" (change shown depending on a change of temperatures).

In other words, the authenticating information holding unit 102 is structured as a storing unit which stores, on the authentic portable medium 2 basis, the portable medium identifier MID for specifying the portable medium 2, and characteristics information indicating input and output characteristics including the environment change of the portable medium 2. The characteristics information indicates plural groups including identifying information C, the first response information R, and the environment change information F each respectively assumed as the input data, the output data, and change identifying data. With respect to the authentic portable medium 2 specified with a portable medium identifier "MID1", the authenticating information holding unit 102 holds, for example, a portable medium identifier "MID1", authenticating information "C11" which is input data into the portable medium 2, first response information "R11" which is output data corresponding to the authentication information "C11" of the portable medium 2, and the environment change information F corresponding to the first response information "R11".

The first response information "R11" is output data to be outputted when the authentic portable medium 2 in the first environment obtains the authenticating information "C11" as input data. Further, the environment change information F associated with the first response information "R11" is a flag indicating whether or not the output, from the authentic portable medium 2 in the second environment in response to the input of the authenticating information "C11", is changed from the above-described first response information "R11", the authenticating information "C11" being obtained by the authentic portable medium 2 in the second environment. In an example shown in FIG. 3, "1" in the environment change information F associated with the first response information "R11" indicates that the output is not changed from the first response information "R11".

Here, the various pieces of data held in the authenticating information holding unit 102 are assumed to be pre-registered. For example, the various pieces of data may be registered when the portable medium 2 is manufactured, the user applied for a use of a service, or the user utilizes the service for the first time after the application of the use of the service.

When plural groups each including the authenticating information C, the first response information R, and the environment change information F of the portable medium 2 are registered, the following technique is employed. For example, a certain number of pieces of predetermined input data (or may be random numbers) are inputted into the portable medium 2 under the first environment. Here, the output data outputted from the portable medium 2 is obtained. Then, the used pieces of input data are assumed as the authenticating information C, and output data corresponding to the authenticating information C is assumed as the first response information R. The plural groups each including the authenticating information C and the first response information R are registered in the authenticating information holding unit 102. Next, an environment of the unique information generating unit 204 in the portable medium 2 is changed into the second environment which is different from the above-described first environment, and input data and output data is obtained in a similar manner. As a result, plural groups each including the authenticating information C and the first response information R under the second environment are generated. Here, when the first response information R matches with the same authenticating information C in the first and the second environments, environment change information F indicating "1" with respect to the authenticating information C is registered to the authenticating information holding unit 102. When the matching is not observed, environment change information F indicating "0" with respect to the authenticating information C is registered to the authenticating information holding unit 102.

It is noted that when the unique information generating unit 204 is a PUF circuit outputting a unique bit, utilizing a difference of propagation delays between two paths in a semiconductor as Patent Reference 1, the environment change information F may be registered as follows. In other words, when the difference between the propagation delays of the two paths is measured, if the difference between the propagation delays is larger than a threshold value, the environment change information F indicating "1" is registered due to a low possibility in the change of the output data with respect to the environment change, and if the difference between the propagation delays is smaller than the threshold value, the environment change information F indicating "0" is registered due to a high possibility in the change of the output data with respect to the environment change.

(3) The Authenticating Information Selecting Unit 103

The authenticating information selecting unit 103 receives the portable medium identifier MID from the inputting unit 101. Then, the authenticating information selecting unit 103: accesses the authenticating information holding unit 102; selects a group out of the plural groups each including the authenticating information C, the first response information R, and the environment change information F, each pieces of information associated with the received portable medium identifier MID; and obtains the selected group. As a method for the selection, the group may be: obtained at random, using a random number generator; or obtained serially (in order). The group may also be obtained at random out of a group in the plural groups which has not been obtained yet. Here, pieces of the authenticating information C, the first response information R, and the environment change information F included in the obtained group are respectively referred to as pieces of selected authenticating information SC, selected first response information SR, and selected environment change information SF. Then, the authenticating information selecting unit 103 stores, into the selected information holding unit 104, the portable medium identifier MID, the obtained selected first response information SR, and the obtained selected environment change information SF. After that, the authenticating information selecting unit 103 outputs the obtained selected authenticating information SC to the environment selecting unit 105.

It is noted that when receiving the portable medium identifier MID from the number-of-times controlling unit 111, the authenticating information selecting unit 103 executes processing similar to the processing in receiving the portable medium identifier MID from the above described inputting unit 101. In the embodiment, moreover, the authenticating information selecting unit 103 is structured to be a group selecting unit selecting any one of groups out of plural groups indicated by the above characteristics information.

(4) The Selected Information Holding Unit 104

The selected information holding unit 104 holds a value selected by the authenticating information selecting unit 103 and the environment selecting unit 105.

Figure 4:
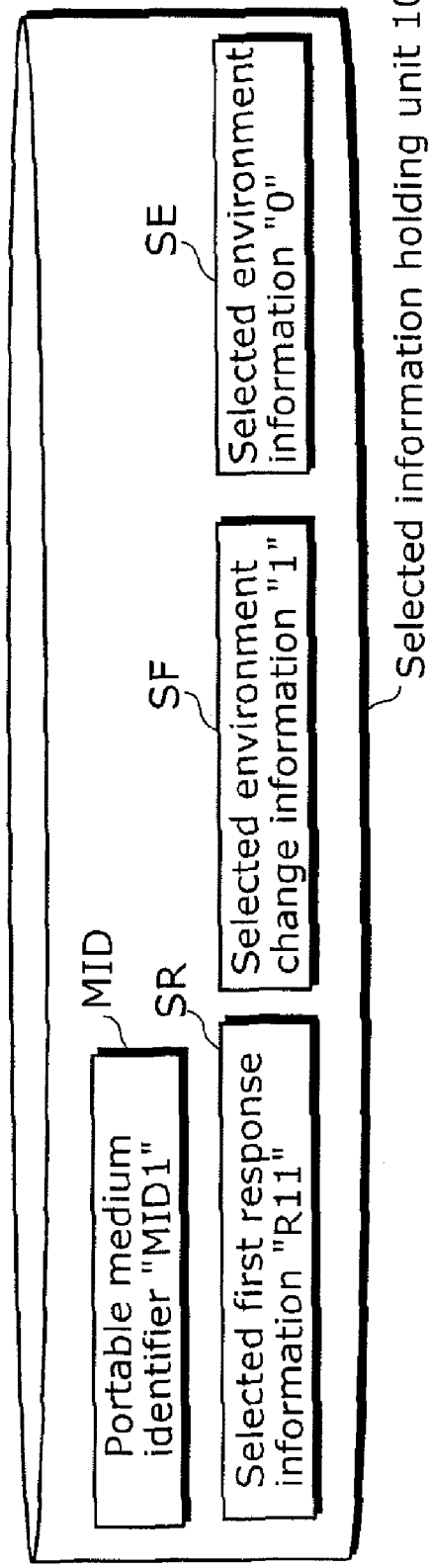
FIG. 4 is a block diagram showing data held in a selected information holding unit in the embodiment of the present invention.

FIG. 4 is a diagram showing data held in the selected information holding unit 104.

Specifically, as shown in FIG. 4, the selected information holding unit 104 holds the portable medium identifier MID, the selected first response information SR, the selected environment change information SF, and selected environment information SE. Here, the portable medium identifier MID, the selected first response information SR, and the selected environment change information SF are data stored by the authenticating information selecting unit 103, and the selected environment information SE is data stored by the environment selecting unit 105. As shown in FIG. 4, for example, the portable medium identifier MID indicating "MID1", the selected first response information SR indicating "R11", the selected environment change information SF indicating "1", and the selected environment information SE indicating "0" for specifying the first environment are stored in the selected information holding unit 104.

(5) The Environment Selecting Unit 105

The environment selecting unit 105 previously holds two pieces of environment information. The two pieces of the environment information respectively correspond to the first and the second environments. The environment information corresponding to the first environment indicates, for example, 30° C. and a supply voltage of 1.8 volts. The environment information corresponding to the second information indicates, for example, 40° C. and a supply voltage of 2.4 volts. Upon receiving the selected authenticating information SC from the authenticating information selecting unit 103, the environment selecting unit 105 first selects one of the two pieces of the environment information, and obtains the selected information. As a method for selecting one of the two pieces of the environment information, the selected information may be: obtained at random, using a random number generator; or obtained in a given predetermined order. When selecting the environment information corresponding to the first environment, the environment selecting unit 105: generates, by indicating "0", the selected environment information SE showing that the environment information corresponding to the first environment is selected; and stores the selected environment information SE indicating "0" into the selected information holding unit 104. Meanwhile, when selecting the environment information corresponding to the second environment, the environment selecting unit 105: generates, by indicating "1", the selected environment information SE showing that the environment information corresponding to the second environment is selected; and stores the selected environment information SE indicating "1" into the selected information holding unit 104. Then, the environment selecting unit 105 outputs to the environment setting unit 106 the selected environment information SE and the selected authenticating information SC.

It is noted in the embodiment that the environment selecting unit 105 is structured to be an environment identifying unit identifying an environment of the portable medium 2.

(6) The Environment Setting Unit 106

The environment setting unit 106 receives the selected environment information SE and the selected authenticating information SC from the environment selecting unit 105. Then, first, the environment setting unit 106 sets the environment of the portable medium 2 to an environment indicated in the received selected environment information SE. For example, the environment setting unit 106 sets the environment of the portable medium 2 to: the first environment (30° C. and a supply voltage of 1.8 volts) when the selected environment information SE indicates "0"; and the second environment (40° C. and a supply voltage of 2.4 volts) when the selected environment information SE indicates "1". The authenticator apparatus 1 includes, for example: a heater and a fan for warming the portable medium 2; and a thermometer. The environment setting unit 106 controls a surface temperature or a surrounding temperature of the portable medium 2 to be a preset temperature. The authenticator apparatus 1 as well includes, for example, a power supply function to supply an electrical current (voltage) to the portable medium 2. The environment setting unit 106 controls the supply voltage amount to the portable medium 2 to a preset supply voltage amount. When finishing the environment setting of the portable medium 2, the environment setting unit 106 outputs the selected authenticating information SC to the authenticating information transmitting unit 107.

(7) The Authenticating Information Transmitting Unit 107

The authenticating information transmitting unit 107 receives the selected authenticating information SC from the environment setting unit 106. Then the authenticating information transmitting unit 107 transmits an authenticating information receiving unit 202 in the portable medium 2 the selected authenticating information SC via the portable medium reader and writer unit.

It is noted that upon receiving the selected authenticating information SC, the authenticating information receiving unit 202 in the portable medium 2 outputs the selected authenticating information SC to the unique information generating unit 204. The unique information generating unit 204 obtains the selected authenticating information SC as input data, and outputs, to a response information transmitting unit 205, output data corresponding to the input data as second response information Rr. The response information transmitting unit 205 transmits the second response information Rr to the response information receiving unit 108 in the authenticator apparatus 1.

(8) The Response Information Receiving Unit 108

Via the portable medium reader and writer unit, the response information receiving unit 108 receives the second response information Rr from the response information transmitting unit 205 in the portable medium 2. Then, the response information receiving unit 108 outputs the received second response information Rr to the response information confirming unit 109.

(9) The Response Information Confirming Unit 109

The response information confirming unit 109 receives the second response information Rr from the response information receiving unit 108. Then, the response information confirming unit 109 receives from the selected information holding unit 104 the portable medium identifier MID, the selected first response information SR, the selected environment change information SF, and the selected environment information SE. The response information confirming unit 109 regards the selected environment change information SF and the selected environment information SE as a condition for authenticating. Based on the comparison result between the selected first response information SR and the second response information Rr under the condition, the response information confirming unit 109 judges whether or not the authentic second response information Rr corresponding to the portable medium identifier MID is obtained from the portable medium 2. Then, the response information confirming unit 109 relates result information RS indicating a result of the judgment to the above described portable medium identifier MID, and stores the result information RS into the result holding unit 110. Further, by every storing of the result information RS into the result holding unit 110, the response information confirming unit 109 outputs the portable medium identifier MID received from the selected information holding unit 104 to the number-of-times controlling unit 111.

FIG. 5 is a table for describing a determination technique by a response information confirming unit 109.

When the selected environment change information SF indicates "1"; that is, the output data from the unique information generating unit 204 does not change from the selected first response information SR due to an environment change, the response information confirming unit 109 confirms whether or not the selected first response information SR is the same as the second response information Rr. In the case where the selected environment information SE indicates "0"; that is, the environment of the portable medium 2 (unique information generating unit 204) is set to the first environment, the response information confirming unit 109 confirms whether or not the selected first response information SR is the same as the second response information Rr.

Here, when the selected first response information SR is the same as the second response information Rr, the response information confirming unit 109 determines that the second response information Rr from the portable medium 2 is authentic, and judges that the authentic second response information Rr has successfully been obtained. As a result, the response information confirming unit 109: generates the result information RS indicating the successful obtainment with "1"; relates the result information RS and number-of-times information to the portable medium identifier MID, the number-of-times information which indicates how many tries have generated the result information RS; and stores the result information RS and the number-of-times information into the result holding unit 110. In the case where the selected first response information SR is different from the second response information Rr, the response information confirming unit 109 determines that the second response information Rr from the portable medium 2 is not authentic, and judges that the effort to obtain the authentic second response information Rr has been a failure. As a result, the response information confirming unit 109: generates the result information RS indicating the failure with "0"; relates the result information RS and number-of-times information to the portable medium identifier MID, the number-of-times information which indicates how many tries have generated the result information RS; and stores the result information RS and the portable medium identifier MID into the result holding unit 110.

Meanwhile, when the selected environment change information SF and the selected environment information SE indicate "0" and "1", respectively; that is, when the output data from the unique information generating unit 204 has changed from the selected first response information SR due to an environment change, and the environment of the portable medium 2 (unique information generating unit 204) is set to the second environment, the response information confirming unit 109 confirms whether or not selected first response information SR is different from the second response information Rr.

Here, when the selected first response information SR is different from the second response information Rr, the response information confirming unit 109 determines that the second response information Rr from the portable medium 2 is authentic, and judges that the authentic second response information Rr has successfully been obtained. As a result, the response information confirming unit 109: generates the result information RS indicating the successful obtainment with "1"; relates the result information RS and number-of-times information to the portable medium identifier MID, the number-of-times information which indicates how many tries have generated the result information RS; and stores the result information RS and the portable medium identifier MID into the result holding unit 110. In the case where the selected first response information SR is the same as the second response information Rr, the response information confirming unit 109 determines that the second response information Rr from the portable medium 2 is not authentic, and judges that the effort to obtain the authentic second response information Rr has been a failure. As a result, the response information confirming unit 109: generates the result information RS which indicates the failure with "0"; relates the result information RS and number-of-times information to the portable medium identifier MID, the number-of-times information which indicates how many tries have generated the result information RS; and stores the result information RS and the portable medium identifier MID into the result holding unit 110.

It is noted in the embodiment that the response information confirming unit 109 is structured to be a judgment unit to: determine whether or not the selected authenticating information SC and the second response information Rr, under the environment indicated in the selected environment information SE, satisfies the input and output characteristics indicated in the characteristics information; and judge that the portable medium 2 is authentic in the case where input and output characteristics are satisfied.

(10) The Result Holding Unit 110

Figure 6:
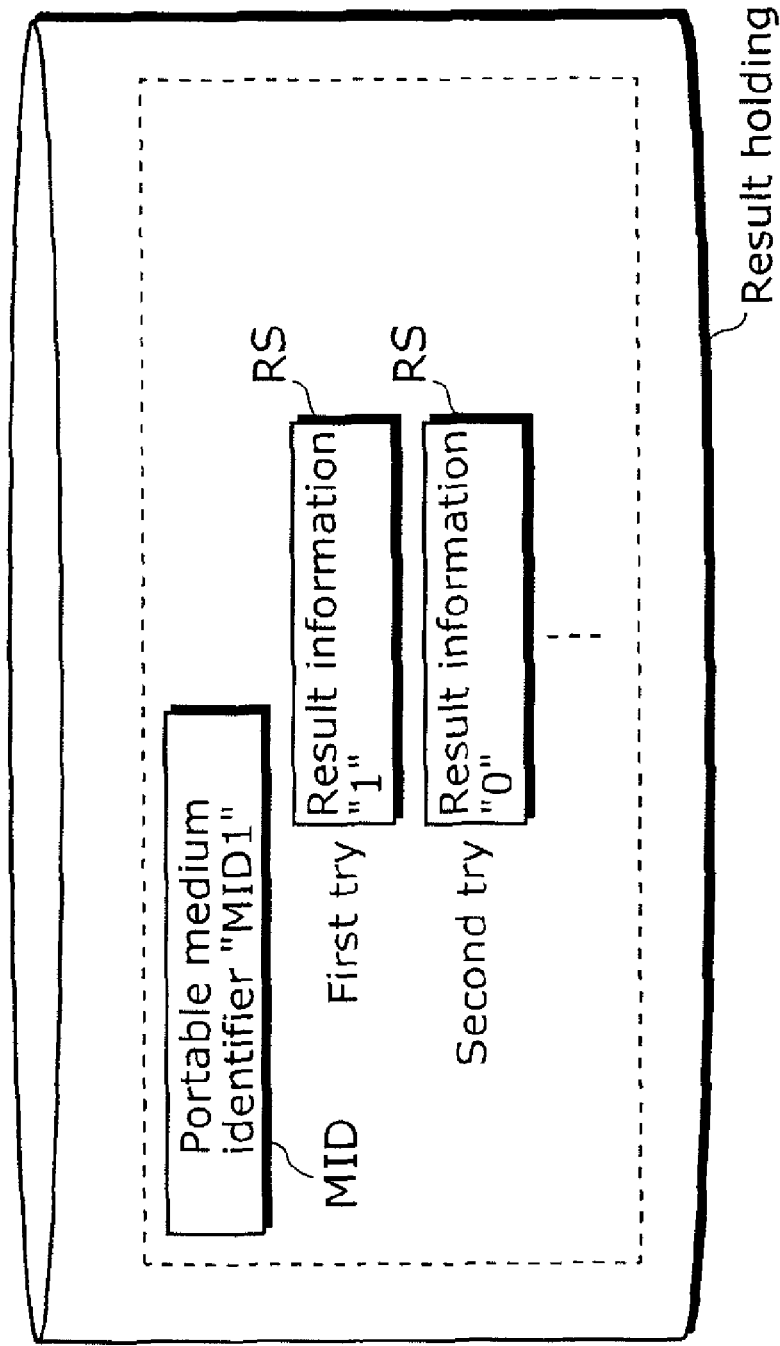
FIG. 6 is a diagram showing data held in a result holding unit in the embodiment of the present invention.

FIG. 6 is a diagram showing data held in the result holding unit 110.

As shown in FIG. 6, the result holding unit 110 holds a group including the portable medium identifier MID, the result information RS of the portable medium identifier MID on the portable medium 2, and the above described number-of-times information. The number-of-times information and the result information RS is stored into the result holding unit 110 with respect to each generation of the result information RS by the response information confirming unit 109. For example, the result holding unit 110 holds: the portable medium identifier MID indicating "MID1"; the result information RS indicating "1" generated for the portable medium identifier MID of the portable medium 2; the number-of-times information indicating that the result information RS is generated on the "first try"; the result information RS indicating "0" generated for the portable medium identifier MID of the portable medium 2; and the number-of-times information indicating that the result information RS is generated on the "second try".

Here, the portable medium identifier MID, the result information RS, and the number-of-times information are renewed by the response information confirming unit 109.

(11) The Number-Of-Times Controlling Unit 111

The number-of-times controlling unit 111 controls the number of times (the number of transmissions) for transmitting the selected authenticating information SC while authentication processing to the portable medium 2 is executed once. In the number of transmissions, a transmission of the selected authenticating information SC followed by a reception of the second response information Rr make up one process. With respect to the portable medium 2 corresponding to the portable medium identifier MID, the number-of-times controlling unit 111 holds the number of times which the selected authenticating information SC has previously been transmitted. The default value is 0. The number-of-times controlling unit 111 receives the portable medium identifier MID from the response information confirming unit 109. When the number of transmissions is not more than predetermined required times (10 times, for example. May be either to be predetermined or changed by each service or each user), the number-of-times controlling unit 111 outputs the portable medium identifier MID to the authenticating information selecting unit 103, and increments the number of transmissions (in one). Meanwhile, when the number of transmissions is equivalent to the predetermined required times, the number-of-times controlling unit 111 resets the number of transmissions to 0, and outputs the portable medium identifier MID to the determining unit 112.

(12) The Determining Unit 112

When receiving the portable medium identifier MID from the number-of-times controlling unit 111, the determining unit 112 accesses the result holding unit 110 to obtain the result information RS indicating the required times (10 times, for example) corresponding to the received portable medium identifier MID. Then, the determining unit 112 calculates a percentage of the result information RS indicating "1" out of the result information RS indicating the required times. When the percentage accounts for not less than a predetermined percentage (80%, for example), the determining unit 112 finally judges that the portable medium 2 including the portable medium identifier MID is authentic, and outputs a final determination result FR indicating "1" to the outputting unit 113. Meanwhile, a percentage accounting for the result information RS indicating "1" is less than the predetermined percentage, the determining unit 112 finally determines that the portable medium 2 is not authentic, and outputs a final determination result FR indicating "0" to the outputting unit 113.

It is noted in the present invention that the determining unit 112, structured to be a final determining unit, determines whether or not the percentage of the result information RS indicating "1", out of the result information RS indicating the required times, is not less than a predetermined percentage (80%, for example). When the percentage of the result information RS indicating "1" is not less than the predetermined percentage, the determining unit 112 finally determines that the portable medium 2 is an authentic apparatus.

(13) The Outputting Unit 113

The outputting unit 113 receives the final determination result FR from the determining unit 112. In the case where the final determination result FR indicates "1", the outputting unit 113 offers a service to the user. Meanwhile, in the case where the final determination result FR indicates "0", the outputting unit 113 controls not to offer a service to the user.

A structure of the authenticator apparatus 1 has been described above. Next, an example of an operation of the authenticator apparatus 1 shall be described.

<An Operation of the Authenticator Apparatus 1>

Figure 7:
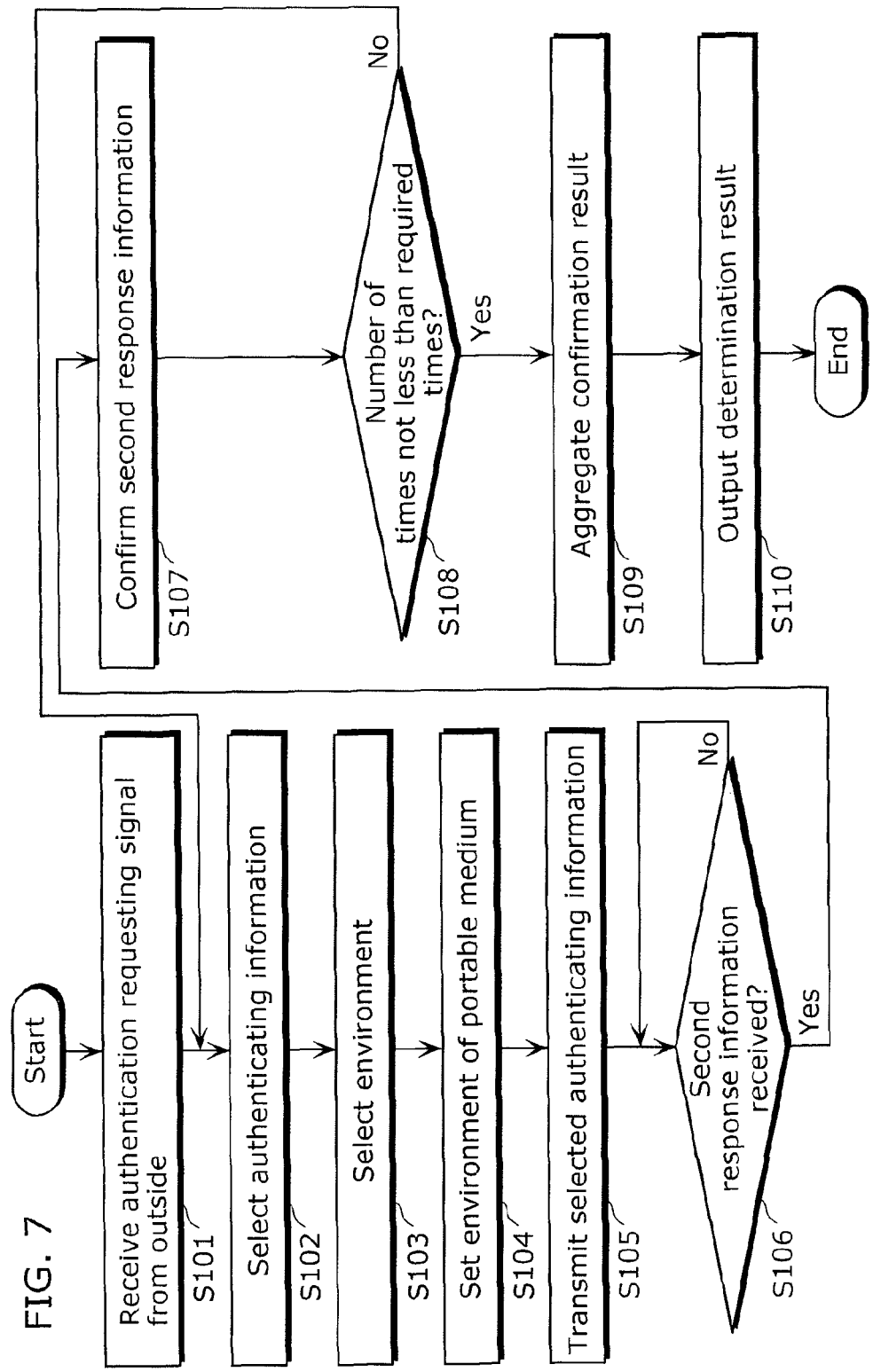
FIG. 7 is a flow chart showing an operation of an authenticator apparatus 1 in the embodiment of the present invention.

With reference to FIG. 7, an operation of the authenticator apparatus 1 shall be described.

FIG. 7 is a flowchart illustrating an operation of the authenticator apparatus 1 in the embodiment.

The inputting unit 101 receives the authentication requesting signal from the outside. Then, the inputting unit 101 accesses the portable medium information holding unit 201 in the portable medium 2, and obtains the portable medium identifier MID specifying the portable medium 2. After that, the inputting unit 101 outputs the obtained portable medium identifier MID to the authenticating information selecting unit 103 (Step S101).

The authenticating information selecting unit 103 receives the portable medium identifier MID from the inputting unit 101. Then, the authenticating information selecting unit 103: accesses the authenticating information holding unit 102; and obtains a group out of the plural groups each including the authenticating information C, the first response information R, and the environment change information F, each pieces of the information associated with the received portable medium identifier MID. The pieces of the authenticating information C, the first response information R, and the environment change information F obtained here are respectively referred to as pieces of the selected authenticating information SC, the selected first response information SR, and the selected environment change information SF. Then, the authenticating information selecting unit 103 stores into the selected information holding unit 104 the portable medium identifier MID, the obtained selected first response information SR, and the obtained selected environment change information SF. After that, the authenticating information selecting unit 103 outputs the obtained selected authenticating information SC to the environment selecting unit 105 (Step S102).

The environment selecting unit 105 receives the selected authenticating information SC from the authenticating information selecting unit 103. Then, the environment selecting unit 105 receives one of previously provided two pieces of environment information. When selecting the environment information corresponding to the first environment, the environment selecting unit 105: generates, by indicating "0", the selected environment information SE showing that the environment information corresponding to the first environment is selected; and stores the selected environment information SE into the selected information holding unit 104. Meanwhile, when selecting the environment information corresponding to the second environment, the environment selecting unit 105: generates, by indicating "1", the selected environment information SE showing that the environment information corresponding to the second environment is selected; and stores the selected environment information SE into the selected information holding unit 104. Then, the environment selecting unit 105 outputs the selected environment information SE and the selected authenticating information SC to the environment setting unit 106 (Step S103).

The environment setting unit 106 receives the selected environment information SE and the selected authenticating information SC from the environment selecting unit 105. First, the environment setting unit 106 sets the environment of the portable medium 2 based on the received selected environment information SE. Upon finishing the setting of the environment of the portable medium 2, the environment setting unit 106 outputs the selected authenticating information SC to the authenticating information transmitting unit 107 (Step S104).

The authenticating information transmitting unit 107 receives the selected authenticating information SC from the environment setting unit 106. Then, the authenticating information transmitting unit 107 transmits the selected authenticating information SC to the authenticating information receiving unit 202 in the portable medium 2 via the portable medium reader and writer unit (Step S105).

Via the portable medium reader and writer unit, the response information receiving unit 108 determines whether or not the response information receiving unit 108 has received the second response information Rr from the response information transmitting unit 205 in the portable medium 2. Here, when determining the reception of the second response information Rr (Step S106: Yes), the response information receiving unit 108 outputs the received second response information Rr to the response information confirming unit 109, and proceeds to processing in Step S107. When determining that the second response information Rr has not been received yet (Step S106: No), the response information receiving unit 108 repeats the processing in Step S106.

The response information confirming unit 109 receives the second response information Rr from the response information receiving unit 108. Then, the response information confirming unit 109 receives from the selected information holding unit 104 the portable medium identifier MID, the selected first response information SR, the selected environment change information SF, and the selected environment information SE. Here, the response information confirming unit 109 confirms the second response information Rr. Specifically, when either the selected environment change information SF indicates "1", or the selected environment information SE indicates "0", the response information confirming unit 109 confirms whether or not the selected first response information SR is the same as the second response information Rr. In the case where the selected first response information SR is the same as the second response information Rr, the response information confirming unit 109 generates the result information RS indicating "1"; that is, indicating a success. In the case where the selected first response information SR is not the same as the second response information Rr, the response information confirming unit 109 generates the result information RS indicating "0"; namely, a failure.

Meanwhile, when the selected environment change information SF and the selected environment information SE respectively indicate "0" and "1", the response information confirming unit 109 confirms whether or not the selected first response information SR is different from the second response information Rr. In the case where the selected first response information SR is different from the second response information Rr, the response information confirming unit 109 generates the result information RS indicating "1"; that is, indicating a success. In the case where the selected first response information SR is the same as the second response information Rr, the response information confirming unit 109 generates the result information RS indicating "0"; that is, indicating a failure. Then, the response information confirming unit 109: stores (writes-once) into the result holding unit 110 the portable medium identifier MID, the result information RS, and the number-of-times information; and outputs the portable medium identifier MID to the number-of-times controlling unit 111 (Step S107).

The number-of-times controlling unit 111 receives the portable medium identifier MID from the response information confirming unit 109. Then, the number-of-times controlling unit 111 determines whether or not the number of transmissions is not less than predetermined required times (10 times, for example) (Step S108). Here, when judging that the number of transmissions is less than the required times (Step S108: No), the number-of-times controlling unit 111 outputs the portable medium identifier MID to the authenticating information selecting unit 103, increments the number of transmissions (in one), and proceeds to processing in Step S102. Meanwhile, when judging that the number of transmissions is not less than the required times; that is the number of transmissions is equivalent to the required times (Step S108: Yes), the number-of-times controlling unit 111 resets the number of transmissions to 0, outputs the portable medium identifier MID to the determining unit 112, and proceeds to processing in Step S109.

Upon receiving the portable medium identifier MID from the number-of-times controlling unit 111, the determining unit 112 accesses the result holding unit 110, and obtains to aggregate the result information RS indicating the required times corresponding to the received portable medium identifier MID. In other words, the determining unit 112 calculates a percentage of the result information RS indicating "1" out of the result information RS indicating the required times (Step S109). In the case where the percentage is not less than the predetermined percentage, the determining unit 112: finally determines that the portable medium 2 is authentic; and generates to outputs to the outputting unit 113 the final determination result FR indicating "1". Meanwhile, the percentage of the result information RS indicating "1" is less than the predetermined percentage, the determining unit 112 finally determines that the portable medium 2 is not authentic, and generates to output to the outputting unit 113 the final determination result FR indicating "0".

The outputting unit 113 receives the final determination result FR from the determining unit 112. In the case where the final determination result FR indicates "1", the outputting unit 113 operates to offer a service to the user. Meanwhile, in the case where the final determination result FR indicates "0", the outputting unit 113 controls not to offer a service to the user.

The above-described is a structure and operations of the authenticator apparatus 1. Next, a structure and operations of the portable medium 2 shall be described.

<A Structure of the Authenticator Apparatus 2>

Figure 8:
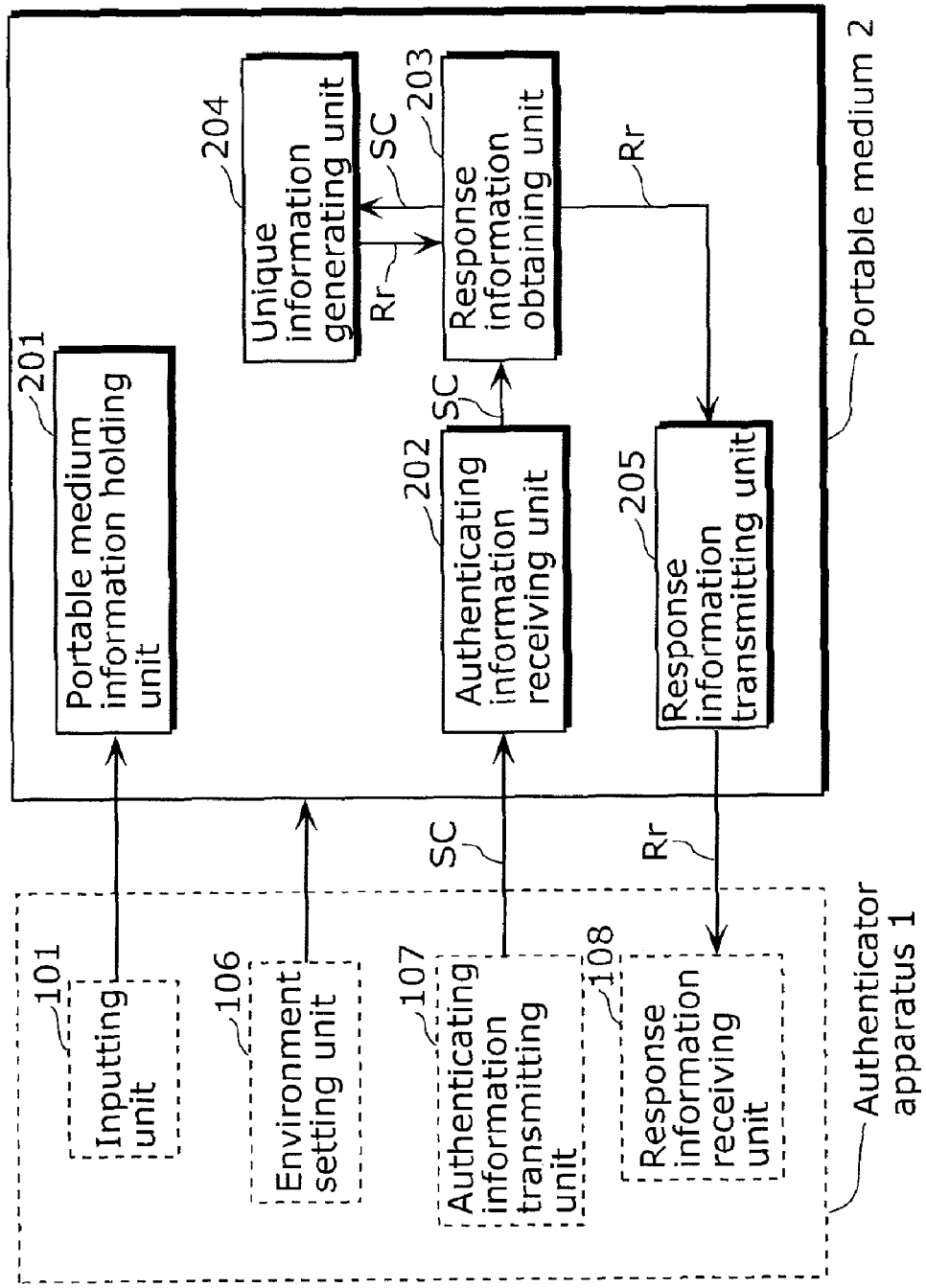
FIG. 8 is a block diagram of a portable medium in the embodiment of the present invention.

FIG. 8 is a block diagram showing a structure of the authenticator apparatus 2 in the embodiment of the present invention. Here, only the portions on authentication processing in the present invention shall be described. Meanwhile, portions offering actual services (ATM services, for example) shall be omitted.

The portable medium 2 includes the portable medium information holding unit 201, the authenticating information receiving unit 202, a response information obtaining unit 203, the unique information generating unit 204, and the response information transmitting unit 205. It is noted that the portable medium 2 also includes an accessing unit, not shown in FIG. 8, transmitting and receiving data to and from the authenticator apparatus 1. Further, a block diagram showing a structure of a part of the authenticator apparatus 1 is also illustrated in FIG. 8. The block diagram mainly illustrates the structural elements in the authenticator apparatus 1 transmitting and receiving information to and from the portable medium 2. The detailed structure of the authenticator apparatus 1 has already been described with reference to FIG. 2.

(1) The Portable Medium Information Holding Unit 201

The portable medium information holding unit 201 holds the portable medium identifier MID. The portable medium identifier MID, for specifying the portable medium 2, is an identifier to be provided when the portable medium 2 is produced. The portable medium identifier MID is an integer value of 128 bits, for example.

(2) The Authenticating Information Receiving Unit 202

The authenticating information receiving unit 202 receives the selected authenticating information SC from the authenticator apparatus 1 via a accessing unit of the portable medium 2. Then, the authenticating information receiving unit 202 outputs the received selected authenticating information SC to the response information obtaining unit 203.

(3) The Response Information Obtaining Unit 203

The response information obtaining unit 203 receives the selected authenticating information SC from the authenticating information receiving unit 202. Then, the response information obtaining unit 203: accesses the unique information generating unit 204, using the selected authenticating information SC as input data; and obtains output data, of the unique information generating unit 204, corresponding to the input data. The response information obtaining unit 203 outputs the output data to the response information transmitting unit 205 as the second response information Rr.

(4) The Unique Information Generating Unit 204

When receiving input data, the unique information generating unit 204 intends to output output data corresponding to the input data. Further, the unique information generating unit 204 is featured to provide output data, in response to some input data, to change depending on an environment. An example of implementing the unique information generating unit 204 is the PUF circuit. The PUF circuit in the Patent Reference 1 is described hereinafter. The PUF circuit includes plural paths passing through different wirings and parts. The PUF circuit uniquely selects two of the above plural paths based on the input data. Then, the PUF circuit compares propagation delays between the two paths, and generates a chip unique value (a value of 1 bit, for example) depending on which path causes a longer delay. In other words, including one or more the PUF circuits described above, the unique information generating unit 204 in the embodiment outputs output data having 1 bit or more as the second response information Rr.

It is noted in the embodiment that the unique information generating unit 204 is structured to be a response information outputting unit to output the second response information Rr.

(5) The Response Information Transmitting Unit 205

The response information transmitting unit 205 receives the second response information Rr from the response information obtaining unit 203. Then, the response information transmitting unit 205 transmits the received second response information Rr to the authenticator apparatus 1 via the accessing unit in the portable medium 2.

The above has described a structure of the portable medium 2. Next, an example of an operation of the portable medium 2 shall be described.

<A Structure of the Portable Medium 2>

Figure 9:
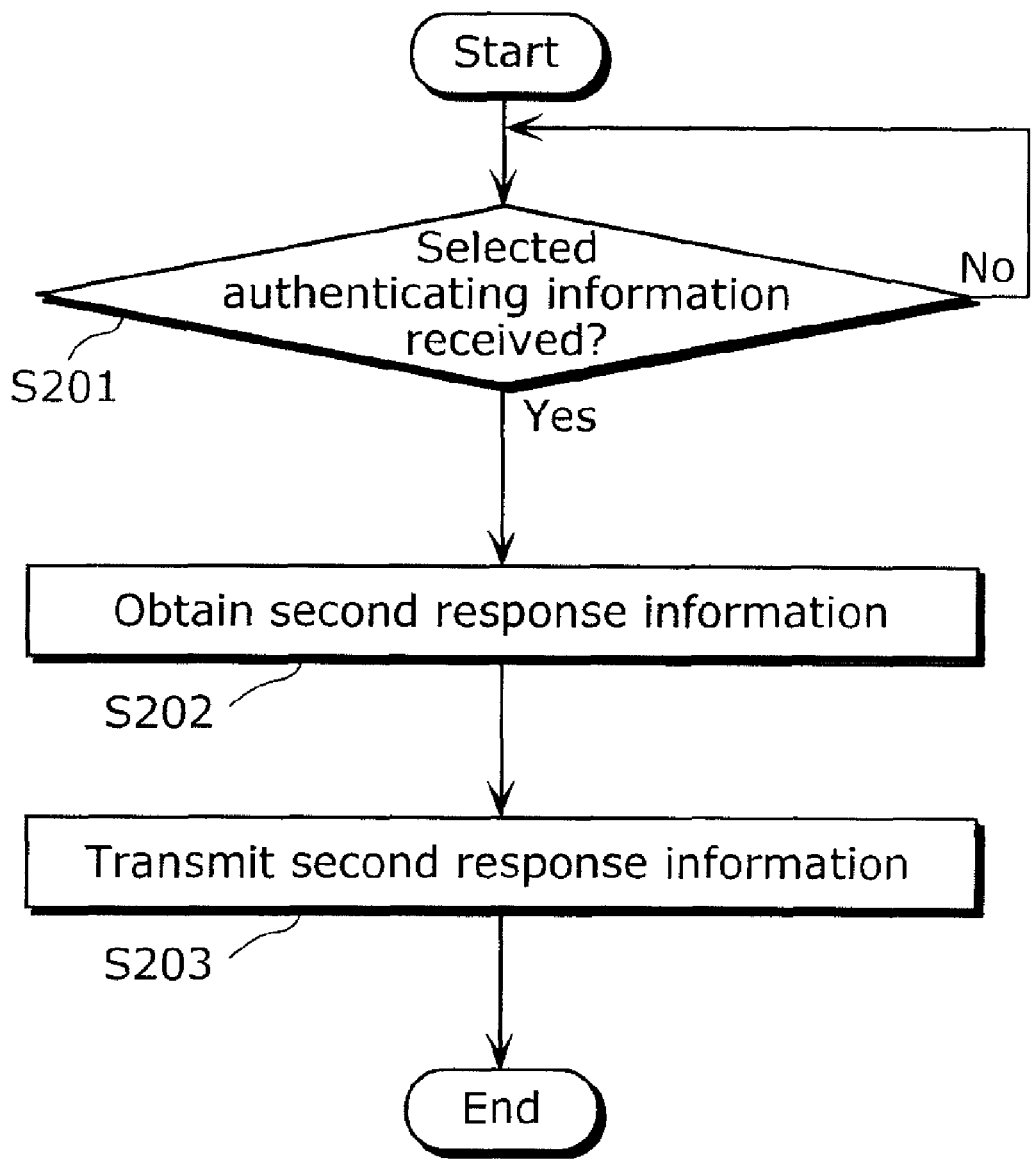
FIG. 9 is a flow chart showing an operation of the portable medium in the embodiment of the present invention.

With reference to FIG. 9, an operation of the portable medium 2 shall be described, hereinafter.

FIG. 9 is a flowchart illustrating an operation of the portable medium 2.

Via the accessing unit of the portable medium 2, the authenticating information receiving unit 202 confirms whether or not the authenticating information receiving unit 202 has received the selected authenticating information SC from the authenticating information transmitting unit 107 in the authenticator apparatus 1 (Step S201). When confirming that the authenticating information receiving unit 202 has not received the selected authenticating information SC yet (Step S201: No), the authenticating information receiving unit 202 repeats the processing in Step S201. Meanwhile, when confirming the reception of the selected authenticating information SC, the authenticating information receiving unit 202 outputs the selected authenticating information SC to the response information obtaining unit 203.

The response information obtaining unit 203 receives the selected authenticating information SC from the authenticating information receiving unit 202. Then, the response information obtaining unit 203: accesses the unique information generating unit 204, using the selected authenticating information SC as input data; and obtains output data. The response information obtaining unit 203 outputs the output data to the response information transmitting unit 205 as the second response information Rr (Step S202).

Then, the response information transmitting unit 205 receives the second response information Rr from the response information obtaining unit 203, and transmits the received second response information Rr to the authenticator apparatus 1 via the accessing unit in the portable medium 2. Then, the processing ends (Step S203).

The above-described is a structure and operations of the portable medium 2.

<Effects of an Information Security System 1>

The above has described an information security system 1 based on the embodiment. The information security system 1 executes the challenge and response authentication while changing an environment of the portable medium 2, by taking advantage of the unique information generating unit 204 providing output data, corresponding to some input data, to change based on the environment. Specifically, upon setting (changing) the environment of the portable medium 2, the authenticator apparatus 1 executes challenge and response authentication, and confirms whether or not the set environment is consistent with the result of the challenge and response authentication. This can screen a clone portable medium having a table with all the input data and the output data of the unique information generating unit 204 copied under a specific environment. The screening is possible because the output data in the clone portable medium does not change with an environment change. This can realize secure authentication processing.

Here, another sophisticated unauthorized user is assumed to successfully specify, despite an environment change, the input data of which the output data of the unique information generating unit 204 is changed. In such a case, the other sophisticated unauthorized user is assumed to create a clone portable medium outputting: the same pieces of output data every time, as for input data whose output does not change with an environment change; and random pieces of output data every time, as for the input data of which output changes with an environment change. Even in this case, the technique in the present invention can screen the clone portable medium. This is because, while setting the same environment, the technique in the present invention can consecutively provide the same input data as for the input data of which output data changes in when an environment changes. In this case, as well, the output data of the clone portable medium described above changes at random. This can screen the clone portable medium.

Here, should another sophisticated unauthorized user be assumed to successfully obtain tables with the input data and the output data of the unique information generating unit 204 copied under various environments. Hence, a clone portable medium having all the tables becomes available. The clone portable medium, however, needs to have a temperature sensor and a voltage sensor in order to select output data according to the result from measurements of the sensors. This discourages the sophisticated unauthorized user to produce the clone portable medium.

The above-described can realize more secure authentication processing than that with a conventional technique.

A Modification Example

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention. The cases described below shall also be included in the present invention.

(1) In the embodiment, the authenticator apparatus 1 causes the environment setting unit 106 to set the environment of the unique information generating unit 204 in the portable medium 2 based on the two set environments (the first environment and the second environment). The present invention shall not be limited to this, however. Based on not less than three set environments, the authenticator apparatus 1 may cause the environment setting unit 106 to set the environment of the unique information generating unit 204 in the portable medium 2. In other words, the environment setting unit 106 may set the environment of the unique information generating unit 204 in the portable medium 2 to any of the first environment, the second environment, the third environment, ... the nth environment (N is an integer not less than 4).

Instead of the environment setting unit 106, the authenticator apparatus 1 may include an environment information obtaining unit (environment obtaining unit) obtaining the environment information of the unique information generating unit 204 in the portable medium 2. For example, the portable medium 2 includes a notifying unit to notify the authenticator apparatus 1 of environment information indicating an environment of the unique information generating unit 204. The environment information obtaining unit obtains the environment information notified by the notifying unit in the portable medium 2. Then, the environment selecting unit 105 stores into the selected information holding unit 104 the environment information obtained by the environment information obtaining unit.

Instead of the environment setting unit 106, the authenticator apparatus 1 may include an environment information measuring unit (environment measuring unit) measuring the environment of the unique information generating unit 204 in the portable medium 2. For example, the environment information measuring unit measures to obtain: a surface temperature and an external temperature of the unique information generating unit 204; and a supply voltage amount to the portable medium 2. Then, the environment selecting unit 105 stores into the selected information holding unit 104 the environment information indicating the environment measured by the environment information measuring unit. Thus, the environment setting unit 106 can be dispensed with.

(2) Further, instead of the environment setting unit 106, the authenticator apparatus 1 may include an environment information predicting unit (environment predicting unit) to predict the environment information of the unique information generating unit 204 in the portable medium 2. For example, the environment information predicting unit may include a timer function and a calendar function, and predict to obtain: time information indicating a time when the second response information Rr is outputted from the portable medium 2; and a temperature of the unique information generating unit 204 based on date information indicating a date. In addition, the environment information predicting unit may comprehend an age of service, and predict to obtain a supply voltage amount based on the age of service. Then, the environment selecting unit 105 stores into the selected information holding unit 104 the environment information indicating the environment including the temperature predicted by the environment information predicting unit and the supply voltage. This allows the environment setting unit 106 to be dispensed with, as described in the modification example (1).

(3) The embodiment has been described in accordance with the systems of the authenticator apparatus 1 (e.g. ATM terminal) and the portable medium 2 (e.g. IC card); however, the present invention shall not be limited to this. In the system of the modification example (3), for example, a server apparatus (equivalent to the authenticator apparatus 1) may authenticate a physically distant client apparatus (equivalent to the portable medium 2). In this case, the environment setting unit 106 in the server may be able to: control the heater and the power source of the client apparatus; or indirectly control the surface temperature and the external temperature of the client apparatus by increasing and decreasing a rotation speed of the fan in the client apparatus. In a combination of the modification examples (2) and (3), the authenticator apparatus 1 may predict to obtain the surface temperature and the external temperature based on an installation position (area) of the client apparatus.

(4) The unique information generating unit 204 in the portable medium 2 is assumed to be the PUF circuit described in the Patent Reference 1. In the present invention, meanwhile, the unique information generating unit 204 may be another kind of PUF circuit. In the modification example (4), the PUF circuit may include a Coating PUF, an Acoustic PUF, and an Optical PUF (c.f. Non Patent References: "Pim Tuyls., Boris Skoric., S. Stallinga., Anton H. M. Akkermans., and W. Ophey. 2005. Information-Theoretic Security Analysis of Physical Uncloneable Functions. Financial Cryptography. pp. 141-155). Further, the unique information generating unit 204 in the portable medium 2 may be other than a PUF circuit as far as the output data changes depending on an environment change. For example, an operation identical to that performed on the present invention can be realized with use of a technique generating a unique identification code out of a first logic signal provided from each of memory cells of a flip-flop, a RAM, and a Static RAM when the power of the semi-conductor apparatus is on (e.g. Patent Reference: Japanese Unexamined Patent Application Publication No. 2006-060109) since the output data changes depending on an environment change.

(5) In the embodiment, the portable medium 2 transmits to the authenticator apparatus 1 the second response information Rr; namely the output data from the unique information generating unit 204, as is; meanwhile, the present invention shall not be limited to this. For example, the authenticator apparatus 1 may send two sets of the selected authenticating information SC to the portable medium 2. In this case, the output data is outputted when one set of the selected authenticating information SC is inputted into the unique information generating unit 204. Here, the portable medium 2 encrypts the other set of the selected authenticating information SC, using the output data as key data. Then, the portable medium 2 transmits the encrypted data to the authenticator apparatus 1 as the second response information Rr. Using the output data corresponding to the one set of the selected authenticating information SC as the key data, the authenticator apparatus 1 may decrypt the received encrypted data, and compare the decrypted data with the other selected authenticating information SC. When encrypting, private-key encryption including the Advanced Encryption Standard (AES) or public-key encryption including the Rivest Shamir Adleman (RSA) may be employed. Further, an electronic signature such as in the El Gamal scheme, a hash function including the Secure Hash Algorithm-1 (the SHA-1), and a one-way function may also be employed.

Similarly, the authenticator apparatus 1 may select two sets of the selected authenticating information SC; regard the selected first response information SR corresponding to one set of the selected authenticating information SC as key data, encrypt the other set of the selected authenticating information SC with use of the key data, and transmit to the portable medium 2: the selected authenticating information SC corresponding to the selected first response information SR used as the key data; and the encrypted selected authenticating information SC. In this case, the output data is outputted when the one set of the selected authenticating information SC is inputted into the unique information generating unit 204. Here, the portable medium 2 decrypts the other set of the selected authenticating information SC, using the output data as key data. Then, the portable medium 2 transmits the decrypted data to the authenticator apparatus 1 as the second response information Rr. The authenticator apparatus 1 compares the selected first response information SR corresponding to the first set of the selected authenticating information SC with the received second response information Rr. This can realize secure authentication processing.

(6) The unique information generating unit 204 in the portable medium 2 may include an error correction function. Depending on a degree of an environment change, the error correction function adjusts a change of the output data from the unique information generating unit 204 based on the correction ability thereof. Specifically, an enhanced correction ability of the error correction function reduces the change of the output data from the unique information generating unit 204 in a significant environment change. A reduced correction ability of the error correction function encourages the output data from the unique information generating unit 204 to change in a little environment change. For example, when correcting an error with use of an iterated code, the error correction function provides: a large number of iterated codes to the unique information generating unit 204 of which output data is susceptible to an error in a little environment change; and a small number of iterated codes to the unique information generating unit 204 of which output data is resistant to an error even in a significant environment change. The correction ability of the error correction function described above can reduce a certain range of variation of the environment change causing the change of the output data in each portable medium 2 (unique information generating unit 204). As a result, the authenticator apparatus 1 can authenticate all the portable media 2 in the predetermined first and second environments with no change in the first and the second environments on the portable medium 2 basis. Such setting of the iterated codes is portable medium 2 is configured at the production or after the shipment of the portable medium 2. For example, when the characteristics of the unique information generating unit 204 change after the shipment, the correction ability of the error correction function therein is enhanced or reduced.

(7) When a physical property of the unique information generating unit 204 has changed with age, the portable medium 2 may notify the authenticator apparatus 1 of the change. In this case, the authenticator apparatus 1 authenticate the portable medium 2, taking the physical property change into consideration. For example, when the selected first response information SR is equal to the second response information Rr in the case where the selected environment change information SF is "1"; that is the output data from the unique information generating unit 204 does not change regardless of an environment, the authenticator apparatus 1 receiving the above notification judges that the authenticator apparatus 1 has failed to obtain the authentic second response information Rr. In other words, the authenticator apparatus 1 can correctly authenticate the portable medium 2, taking aged deterioration of the portable medium 2 into consideration.

(8) Specifically, each of the above described apparatuses is included in a computer system which consists of a micro processor, a ROM, a RAM, a hard disk unit a keyboard, and a mouse. The RAM or the hard disk unit stores a computer program. Each apparatus achieves the function thereof by the micro processor operating on the computer program. Here, the computer program includes a combination of plural instruction codes sending an instruction to the computer in order to achieve a predetermined function.

(9) Some or all of the structural elements having each of the above described apparatus may be included in a single system Large Scale Integration (LSI). A system LSI, an ultra-multifunction LSI, is manufactured with plural structural units integrated on a single chip. Specifically, the system LSI is a computer system having a micro processor, a ROM, and a RAM. The RAM stores a computer program. The system LSI achieves the function thereof by the micro processor operating on the computer program.

(10) Some or all of the structural elements having each of the above described apparatuses may be included in an IC card or a single module detachable to and from each of the apparatuses. The IC card or the module is a computer system which consists of a micro processor, a ROM, and a RAM. The IC card and the module may also include the above described ultra-multifunction LSI. The IC card and the module achieve the function thereof by the micro processor operating on the computer program. The IC card and the module may also be tamper-resistant.

(11) The present invention may be in methods described above. The present invention may also be a computer program executing the methods by a computer and a digital signal including the computer program.

(12) The present invention may further include a computer-readable recording medium which stores the computer program or the digital signal into a flexible disk, a hard disk, a CD-ROM, an MO, a DVD, a DVD-ROM, a DVD-RAM, a BD (Blu-ray Disc) and a semi-conductor memory. The present invention may also be the digital signal recorded in the recording media.

(13) The present invention may further transmit the computer program or the digital signal via a network and data broadcast mainly including an electronic communications line, a wireless or a wired communications line and the Internet.

(14) The present invention may also be a computer system including a micro processor and a memory. The memory may record the computer program described above, and the micro processor may operate on the computer program.

(15) The present invention can be implemented by another independent computer system by storing to transfer the program or the digital signal in a recording medium or via a network.

(16) The present invention may be a combination of the above embodiment with any of the above modification example.

INDUSTRIAL APPLICABILITY

A authenticator apparatus in the present invention is effective to make it difficult for a sophisticated unauthorized user to masquerade, and applicable to an authenticator apparatus authenticating a user's IC card in a system providing services to the user, such as an ATM. The authenticator apparatus in the present invention is useful to authenticate an authenticatee apparatus which requires significantly high security

The invention claimed is:

1. An authenticator apparatus which authenticates an authenticatee apparatus, said authenticator apparatus comprising:
   one or more processors; and
   a memory,
   wherein the memory includes a storing unit which previously stores characteristic information indicating an input and output characteristic involving an environment change of an authentic authenticatee apparatus entitled to be authentic,
   wherein the one or more processors include:
      an authenticating information transmitting unit configured to transmit authenticating information to the authenticatee apparatus;
      a response information receiving unit configured to receive response information outputted from the authenticatee apparatus in response to an input of the authenticating information;
      an environment identifying unit configured to identify an environment of the authenticatee apparatus;
      a judging unit configured to determine whether or not the authenticating information and the response information satisfy the input and output characteristic indicated in the characteristic information stored in said storing unit, and to judge that the authenticatee apparatus is authentic in the case where the input and output characteristic is satisfied, the authenticating information and the response information being in the environment identified by said environment identifying unit; and an environment setting unit configured to set the environment of the authenticatee apparatus, wherein said environment identifying unit is configured to identify the environment set by said environment setting unit, wherein the characteristic information indicates input data, output data, and change identification data as the input and output characteristic, the output data being outputted in response to an input of the input data by the authentic authenticatee apparatus in a predetermined first environment, the change identification data indicating whether or not an output in response to the input of the input data from the authentic authenticatee apparatus in a second environment changes from the output data, the second environment being different from the first environment, wherein said authenticating information transmitting unit is configured to transmit the input data as the authenticating information, wherein said storing unit stores the characteristic information indicating a plurality of groups each including the input data, the output data, and the change identification data, wherein said one or more processors further include a group selecting unit configured to select any one group out of the plurality of groups indicated in the characteristic information, wherein said authenticating information transmitting unit is configured to transmit input data, included in the group selected by said group selecting unit, as the authenticating information, wherein said judging unit is configured to compare the response information with output data included in a same group to which the input data belongs, the input data being transmitted by said authenticating information transmitting unit, wherein said group selecting unit is configured to sequentially select groups out of the plurality of groups for the authenticatee apparatus, wherein said authenticating information transmitting unit is configured to transmit input data included in each of the selected groups as the authenticating information with respect to each of selections of the group by said group selecting unit, wherein said judging unit is configured to compare the response information with the output data corresponding to the input data with respect to each of transmissions of the input data, and to judge whether or not the authenticatee apparatus is authentic, and wherein said one or more processors further include a final determining unit configured to: determine whether or not a proportion of the number of times, which the authenticatee apparatus has been determined to be authentic out of the number of determinations by the judging unit, is not less than a predetermined proportion; and finally determine that the authenticatee apparatus is authentic in the case where the proportion is not less than the predetermined proportion.

2. The authenticator apparatus according to claim 1, wherein said judging unit is configured to:

compare the response information and the output data either when the change identification data indicates no change in the output or when the environment identified by said environment identifying unit is the first environment, and judge that the authenticatee apparatus is authentic in the case where the response information and the output data are equivalent to each other; and compare the response information and the output data when the change identification data indicates a change in the output, and the environment identified by said environment identifying unit is the second environment, and judge that the authenticatee apparatus is authentic in the case where the response information and the output data are different from each other.

3. The authenticator apparatus according to claim 1, wherein said one or more processors further include an environment selecting unit configured to select one of the first and the second environments, and wherein said environment setting unit is configured to set the environment of the authenticatee apparatus to the environment selected by said environment selecting unit.

4. The authenticator apparatus according to claim 3, wherein said group selecting unit is configured to randomly select any one group out of the plurality of groups, and wherein said environment selecting unit is configured to randomly select one of the first and the second environments.

5. The authenticator apparatus according to claim 1, wherein said one or more processors further include an environment obtaining unit configured to obtain the environment information of the environment, of the authenticatee apparatus, notified by the authenticatee apparatus, wherein said environment identifying unit is configured to identify the environment indicated in the environment information obtained by said environment obtaining unit.

6. The authenticator apparatus according to claim 1, wherein said one or more processors further include an environment measuring unit configured to measure the environment of the authenticatee apparatus, wherein said environment identifying unit is configured to identify the environment measured by said environment measuring unit.

7. The authenticator apparatus according to claim 1, wherein said one or more processors further include an environment predicting unit configured to predict the environment of the authenticatee apparatus, wherein said environment identifying unit is configured to identify the environment predicted by said environment predicting unit.

8. The authenticator apparatus according to claim 7, wherein said environment predicting unit is configured to predict the environment of the authenticatee apparatus based either on: a time, a date, and a location at which the authenticatee apparatus outputs the response information; or a period of time for which the authenticatee apparatus has been used until the time.

9. The authenticator apparatus according to claim 1, wherein said response information receiving unit is configured to receive the response information outputted when a Physical Unclonable Function (PUF) circuit in the authenticatee apparatus obtains the authenticating information.

10. The authenticator apparatus according to claim 1, wherein said environment identifying unit is configured to identify at least one of the temperature of the authenticatee apparatus and a voltage supplied to said authenticator apparatus as the environment.

11. An authenticating method for authenticating an authenticatee apparatus,
wherein said authenticating method utilizes a storing unit which previously stores characteristic information indicating an input and output characteristic involving an environment change of an authentic authenticatee apparatus entitled to be authentic, and includes:
transmitting authenticating information to the authenticatee apparatus;
receiving response information outputted from the authenticatee apparatus in response to an input of the authenticating information;
identifying an environment of the authenticatee apparatus;
determining whether or not the authenticating information and the response information satisfy the input and output characteristic indicated by the characteristic information stored in the storing unit, and judging that the authenticatee apparatus is authentic in the case where the input and output characteristic is satisfied, the authenticating information and the response information being in the environment identified in said identifying; and
setting the environment of the authenticatee apparatus,
wherein said identifying includes identifying the environment set in said setting,
wherein the characteristic information indicates input data, output data, and change identification data as the input and output characteristic, the output data being outputted in response to an input of the input data by the authentic authenticatee apparatus in a predetermined first environment, the change identification data indicating whether or not an output in response to the input of the input data from the authentic authenticatee apparatus in a second environment changes from the output data, the second environment being different from the first environment,
wherein said transmitting includes transmitting the input data as the authenticating information,
wherein the storing unit stores the characteristic information indicating a plurality of groups each including the input data, the output data, and the change identification data,
wherein said authenticating method further includes selecting any one group out of the plurality of groups indicated in the characteristic information,
wherein said transmitting transmits input data, included in the group selected by said selecting, as the authenticating information,
wherein said judging compares the response information with output data included in a same group to which the input data belongs, the input data being transmitted by said transmitting,
wherein said selecting to sequentially selects groups out of the plurality of groups for the authenticatee apparatus,
wherein said transmitting transmits input data included in each of the selected groups as the authenticating information with respect to each of selections of the group by said selecting,
wherein said judging compares the response information with the output data corresponding to the input data with respect to each of transmissions of the input data, and judges whether or not the authenticatee apparatus is authentic, and
wherein said authenticating method further includes: determining whether or not a proportion of the number of times, which the authenticatee apparatus has been determined to be authentic out of the number of determinations by said judging, is not less than a predetermined proportion; and finally determining that the authenticatee apparatus is authentic in the case where the proportion is not less than the predetermined proportion.

12. A non-transitory computer readable recording medium having stored thereon a computer program for authenticating an authenticatee apparatus,
wherein said computer program uses a storing unit which previously stores characteristic information indicating an input and output characteristic involving an environment change of an authentic authenticatee apparatus entitled to be authentic, and causes a computer to perform a method comprising:
transmitting authenticating information to the authenticatee apparatus;
receiving response information outputted from the authenticatee apparatus in response to an input of the authenticating information;
identifying an environment of the authenticatee apparatus;
determining whether or not the authenticating information and the response information satisfy the input and output characteristic indicated by the characteristic information stored in the storing unit, and judging that the authenticatee apparatus is authentic in the case where the input and output characteristic is satisfied, the authenticating information and the response information being in the environment identified in said identifying; and
setting the environment of the authenticatee apparatus,
wherein said identifying includes identifying the environment set in said setting,
wherein the characteristic information indicates input data, output data, and change identification data as the input and output characteristic, the output data being outputted in response to an input of the input data by the authentic authenticatee apparatus in a predetermined first environment, the change identification data indicating whether or not an output in response to the input of the input data from the authentic authenticatee apparatus in a second environment changes from the output data, the second environment being different from the first environment,
wherein said transmitting includes transmitting the input data as the authenticating information,
wherein the storing unit stores the characteristic information indicating a plurality of groups each including the input data, the output data, and the change identification data,
wherein said authenticating method further includes selecting any one group out of the plurality of groups indicated in the characteristic information,
wherein said transmitting transmits input data, included in the group selected by said selecting, as the authenticating information,
wherein said judging compares the response information with output data included in a same group to which the input data belongs, the input data being transmitted by said transmitting,
wherein said selecting to sequentially selects groups out of the plurality of groups for the authenticatee apparatus,
wherein said transmitting transmits input data included in each of the selected groups as the authenticating information with respect to each of selections of the group by said selecting, wherein said judging compares the response information with the output data corresponding to the input data with respect to each of transmissions of the input data, and judges whether or not the authenticatee apparatus is authentic, and wherein said authenticating method further includes: determining whether or not a proportion of the number of times, which the authenticatee apparatus has been determined to be authentic out of the number of determinations by said judging, is not less than a predetermined proportion; and finally determining that the authenticatee apparatus is authentic in the case where the proportion is not less than the predetermined proportion.

13. An integrated circuit which authenticates an authenticatee apparatus, said integrated circuit comprising:

one or more processors; and a memory, wherein the memory includes a storing unit which previously stores characteristic information indicating an input and output characteristic involving an environment change of an authentic authenticatee apparatus entitled to be authentic, wherein the one or more processors include:

an authenticating information transmitting unit configured to transmit authenticating information to the authenticatee apparatus;

a response information receiving unit configured to receive response information outputted, in response to an input of the authenticating information, from the authenticatee apparatus;

an environment identifying unit configured to identify an environment of the authenticatee apparatus;

a judging unit configured to determine whether or not the authenticating information and the response information satisfy the input and output characteristic indicated by the characteristics information stored in said storing unit, and to judge that the authenticatee apparatus is authentic in the case where the input and output characteristic is satisfied, the authenticating information and the response information being in the environment identified by said environment identifying unit; and an environment setting unit configured to set the environment of the authenticatee apparatus, wherein said environment identifying unit is configured to identify the environment set by said environment setting unit, wherein the characteristic information indicates input data, output data, and change identification data as the input and output characteristic, the output data being outputted in response to an input of the input data by the authentic authenticatee apparatus in a predetermined first environment, the change identification data indicating whether or not an output in response to the input of the input data from the authentic authenticatee apparatus in a second environment changes from the output data, the second environment being different from the first environment, wherein said authenticating information transmitting unit is configured to transmit the input data as the authenticating information, wherein said storing unit stores the characteristic information indicating a plurality of groups each including the input data, the output data, and the change identification data, wherein said one or more processors further include a group selecting unit configured to select any one group out of the plurality of groups indicated in the characteristic information, wherein said authenticating information transmitting unit is configured to transmit input data, included in the group selected by said group selecting unit, as the authenticating information, wherein said judging unit is configured to compare the response information with output data included in a same group to which the input data belongs, the input data being transmitted by said authenticating information transmitting unit, wherein said group selecting unit is configured to sequentially select groups out of the plurality of groups for the authenticatee apparatus, wherein said authenticating information transmitting unit is configured to transmit input data included in each of the selected groups as the authenticating information with respect to each of selections of the group by said group selecting unit, wherein said judging unit is configured to compare the response information with the output data corresponding to the input data with respect to each of transmissions of the input data, and to judge whether or not the authenticatee apparatus is authentic, and wherein said one or more processors further include a final determining unit configured to: determine whether or not a proportion of the number of times, which the authenticatee apparatus has been determined to be authentic out of the number of determinations by the judging unit, is not less than a predetermined proportion; and finally determine that the authenticatee apparatus is authentic in the case where the proportion is not less than the predetermined proportion.

* * * * *